United States Patent Office 3,481,845
Patented Dec. 2, 1969

---

3,481,845
ELECTROLYTIC PREPARATION OF ESTERS OF UNSATURATED ACIDS
Donald M. Fenton, Anaheim, Calif., assignor to Union Oil Company of California, Los Angeles, Calif., a corporation of California
No Drawing. Continuation-in-part of application Ser. No. 375,342, June 15, 1964. This application Jan. 8, 1968, Ser. No. 696,143
Int. Cl. B01k 1/00; C07b 3/00, 29/06
U.S. Cl. 204—59                                 5 Claims

ABSTRACT OF THE DISCLOSURE

The invention comprises a method for the preparation of esters of alpha, beta-unsaturated acids and of beta-alkoxy alkanoic acids by contacting a hydrocarbon olefin and carbon monoxide with an alcoholic reaction medium containing a platinum group metal. The alcoholic reaction medium is maintained in the anode of an electrolytic cell separated by a porous diaphragm. The cathode chamber contains a solution of a current conducting material such as an aqueous or alcoholic solution of a mineral acid and a direct current voltage is imposed across electrodes maintained in the two chambers. The reaction is performed at temperatures from about 20° to about 250° C. and a pressure from atmospheric to about 2000 p.s.i.g. with a current voltage from about 2 to about 100 volts, sufficient to provide from about 0.4 to about $4 \times 10^{-5}$ amperes per square centimeter of electrode surface. Under these conditions the olefin is oxidatively carbonylated and esterified with the alcoholic reaction medium to produce the ester of alpha,beta-ethylenically unsaturated carboxylic acids and beta-alkoxy carboxylic acids. A specific example is the oxidation of ethylene to ethyl and methyl acrylates and beta-ethoxy- or beta-methoxy-propionates. The latter products can readily be cracked to recover the alcohol and the acrylate.

---

DESCRIPTION OF THE INVENTION

This invention is a continuation-in-part of Ser. No. 375,342 filed June 15, 1964, now patent 3,397,225 and Ser. No. 426,382, filed Jan. 18, 1965, now patent 3,397,226.

This invention relates to a method for the preparation of esters of unsaturated acids from olefins and in a specific embodiment prescribes a method for the direct preparation of acrylates from ethylene using an electrolytic processing to achieve a continuous process.

Commercially, most acrylate esters are produced from acetylene by the oxo process employing a carbonyl catalyst, although some acrylates are also prepared from beta-propiolactone and from ethylene cyanohydrin. Almost the entire production of methacrylates is derived from acetone and hydrogen cyanide by a fairly complex series of reactions.

While acrylate esters are commercially prepared in this fashion, these preparations employ relatively expensive raw materials and complex process steps.

It is an object of this invention to provide a direct method of preparation of esters of unsaturated acids.

It is also an object of this invention to provide a method for the preparation of such esters from olefins.

It is a specific object of this invention to provide a preparation of acrylate esters from ethylene.

I have now found that esters of unsaturated acids, particularly alkyl acrylates, can be readily obtained from hydrocarbon olefins by contacting the olefin and carbon monoxide with a substantially anhydrous alcoholic solution of a soluble salt of a platinum group metal in a high oxidation state. The reaction results in a stoichiometric reduction of the platinum metal to a lower oxidation state. To increase the conversion, I prefer to also employ a redox agent that can return the platinum metal to its higher oxidation state for further reaction. The reaction is illustrated by the following:

$$MX_2 + CO + ROH + R_1CH{=}CHR_2 \xrightarrow{\text{catalyst}}$$
$$R_1HC{=}CR_2CO_2R + 2HX + MX$$

wherein:
The catalyst comprises a platinum group metal in a high oxidation state;
R can be alkyl, aryl, alkaryl or aralkyl;
$R_1$, $R_2$ and $R_3$ can be hydrogen, alkyl, aryl, alkaryl, aralkyl;
X is a suitable anion; and
M represents a multivalent metal cation which functions as a redox agent.

In its simplest embodiment, the hydrocarbon olefin is ethylene, the alcohol is methanol, the anion is chloride, and the resultant ester is methyl acrylate and/or methyl-beta-methoxy-propionate. In other embodiments, the hydrocarbon olefin can be propylene and the resultant product will comprise methyl crotonate, methyl methacrylate and methyl-beta-methoxybutyrate.

The esters of beta-alkoxy acids are produced by addition of an alcohol reactant to the unsaturated carbons of the desired unsaturated esters or of the reactant olefin. This addition occurs concurrently in the cell; however, it does not alter the oxidative carbonylation previously mentioned wherein a hydrogen of an unsaturated carbon is replaced by the formyl group. The desired unsaturated ester can be readily obtained from the alkoxy substituted ester by cracking the latter thermally or catalytically at temperatures from 100° to 350° C. to liberate the alcohol and unsaturated ester.

The reaction can be conducted under relatively mild conditions, e.g., 25° to about 300° C. and pressures from about atmospheric to 2500 p.s.i.g., sufficient to maintain a liquid phase in the reaction zone. The reaction, which is performed under anhydrous conditions, results in the stoichiometric reduction of redox agent to its lower oxidation state as shown in the aforementioned reaction.

The aforeindicated reaction can be practiced in a continuous fashion if the reaction is performed in the anode chamber of an electrolytic cell and a direct current voltage is applied to the electrodes to electrolytically reoxidize the reduced platinum group metal to its higher oxidation state. When a multivalent metal salt is used to accelerate the oxidation of the platinum group metal, the redox agent is reduced to a lower oxidation state and when this reaction is performed in the anode chamber of the electrolytic cell, the redox agent can be reoxidized to its higher oxidation state by electrolysis. In this application the redox agent is included as a soluble salt in the anolyte of the electrolytic cell and electrons are removed therefrom by the application of the external direct current voltage to the cell, thereby maintaining the redox agent in its high oxidation state.

Referring now to the alcoholic reactant which, preferably, is also the reaction medium, any alkyl, cycloalkyl, aryl, alkaryl or aralkyl monohydroxy alcohol having from about 1 to 20 carbons can be employed. Preferably, aliphatic alcohols having about 1 to 6 carbons are used such as methanol, ethanol, propanol, isopropanol, butanol, isobutanol, pentanol, isopentanol, hexanol, heptanol, octanol, nonyl, decanol, etc. Cyclic alcohols such as cyclohexanol, cyclopentanol, 2-ethyl cyclohexanol, etc., can be employed. Phenol, naphthol, ortho, meta or para cresol, cumenol, xylenol, etc. can also be employed if desired.

As previously mentioned, the alcohol is preferably used in excess and thus comprises the reaction medium. If desired, however, other organic solvents which are liquid at the reaction conditions and inert to the reactants and products can also be employed. Such solvents include for example: formamide, acetamide and N-substituted derivatives thereof; various poly ethers such as ethylene glycol diisoamyl ether, ethylbenzyl ether, diethylene glycol diethyl ether, triethylene glycol diethyl ether, tetraethylene glycol dimethyl ether, etc.

Formamide, acetamide and the N—$C_1$ to $C_5$ alkyl substituted derivatives thereof can also be used as solvents. Examples of these are dimethyl formamide, dimethyl acetamide, diethyl formamide, diisopropyl formamide, diamyl acetamide, butyl ethyl formamide, etc.

The acid portion of the ester produced in accordance with my invention is derived from the olefin and contains one more carbon than the olefin. Accordingly, the identity of the product desired dictates the choice of hydrocarbon olefin; acrylates requiring the use of ethylene. Esters of higher unsaturated acids, however, can be obtained from other olefins and the following are typical of olefins which can be reacted: ethylene, propylene, butene-1, butene-2, isobutene, pentene-1, pentene-2, 2-methylbutene-1, 2-methylbutene-2, cyclopentene, hexene-1, hexene-2, hexene-3, cyclohexene, 2-ethylbutene-1, 2-methylpentene-1, heptene-3, 2-ethylhexene-3, cycloheptene, 1-methylcyclohexene, 1-octene, isooctene, cyclooctene, 1-ethylcyclohexene, 1-nonene, 1-decene, 1-butylcyclohexene, 1,3-diethylcyclohexene, isodecene, indene, styrene, alpha-methylstyrene, allylbenzene, etc. In general, any hydrocarbon olefin having from about 2 to about 20 carbons, preferably from about 2 to about 6 carbons, can be employed in the reaction provided that at least one of the unsaturated carbons is bonded to a hydrogen to form an available oxidation site.

The reaction is performed in the anode chamber of the electrolytic cell under anhydrous conditions at temperatures from about 25° to 300° C., preferably from about 100° to about 225° C. and pressures sufficient to maintain liquid phase conditions. Preferably, elevated pressures to increase the solubility of the gaseous reactants in the reaction medium are employed, e.g., pressures from about 100 to about 2500 p.s.i.g.; most preferably from about 500 to about 1000 p.s.i.g. are employed. As previously mentioned, the reaction is performed by introducing the hydrocarbon olefin and the carbon monoxide into contact with the alcoholic reaction medium which contains dissolved quantities of a soluble cupric salt and a platinum group metal.

The platinum group metal can be of the platinum subgroup, i.e., platinum, rhodium or ruthenium or of the palladium subgroup, i.e., palladium, iridium or osmium. Palladium is preferred because of its demonstrated greater activity. In general, the platinum group metal can be employed in amounts between about 0.001 and 5.0 weight percent of the liquid reaction medium; preferably between about 0.04 and about 0.5 weight percent. The platinum group metal can be introduced into the reaction medium as a finely divided metal, as a soluble salt or as a chelate. Examples of suitable salts are the halides, sulfates, nitrates, and salts of the lower ($C_1$-$C_5$) carboxylates such as palladium chloride, rhodium acetate, ruthenium bromide, osmium oxide, iridium nitrate, palladium sulfate, platinum acetate, etc. Examples of suitable chelates are palladium acetylacetonate and complexes of the aforementioned platinum group metal ions with such conventional chelating agents as citric acid, ethylene diamine tetraacetic acid, etc.

As previously mentioned, various redox compounds can optionally be used in the reaction medium to accelerate the rate of reaction. In general, any multivalent metal salts having an oxidation potential higher, i.e., more positive than the platinum metal in the solution, can be used. Typical of such are the soluble salts of the multivalent metal ions such as the $C_1$ to $C_5$ fatty acid carboxylates, e.g., propionates, valerates, acetates, etc.; nitrates; sulfates; halides, e.g., bromides, chlorides, etc.; of copper, iron, manganese, cobalt, mercury, nickel, cerium, uranium, bismuth, tantalum, chromium, molybdenum, or vanadium. Of these, cupric and ferric salts are preferred and cupric salts are most preferred. Examples of the preferred cupric salts are cupric chloride, cupric bromide, cupric iodide, cupric fluoride, cupric nitrate, cupric sulfate, cupric acetate, cupric valerate, etc. The cupric salt can be employed in any desired amount, the higher concentrations being capable of effecting a higher conversion before requiring regeneration since, as the reaction illustrates, a stoichiometric quantity of the cupric salt is reduced to a cuprous salt in the oxidation.

The alcoholic reaction medium can contain from about 1 to about 25 weight percent of a cupric salt soluble in the reaction medium. During the reaction the soluble cupric salt is reduced to the cuprous state and is regenerated by the removal of electrons therefrom in the electrolytic cell. Preferably the concentration of the cupric salt is from about 5 to about 20 weight percent, most preferably from about 5 to about 10 weight percent.

The reaction proceeds by a mechanism wherein the platinum metal is reduced to a lower oxidation state and then is oxidized by the redox agent. To facilitate this oxidation and thereby increase the rate of reaction, I prefer to employ a reaction medium that contains between about 0.05 to 5.0 weight percent free or coordinately bonded or covalently bonded halogen in the reaction zone. Preferably, concentrations between about 0.1 and 3.0 weight percent are employed. This amount of halogen is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved. The halogen can be added as elemental chlorine or bromine; however, it is preferred to employ less volatile halogen compounds such as hydrogen, alkali metal or ammonium halide, e.g., hydrogen chloride, hydrogen bromide, cesium chloride, potassium bromide, sodium bromate, lithium chlorate; ammonium bromide, ammonium chloride, etc. Salts of the perhydrohalic acids such as lithium perchlorate, sodium perchlorate, potassium perbromate, cesium perchlorate, etc. can also be added to increase electrical conductivity and reactivity of the anolyte. These salts can also be added to the catholyte to increase its conductivity. Also, the halides of any of the aforementioned platinum group metals can be added to the anolyte to supply a portion of the bromide or chloride and, when the hereafter mentioned multivalent metal redox salts are employed, these too can be added as the chloride or bromide.

If desired, a suitable dehydrating agent can be used to maintain the reaction under anhydrous conditions. Examples of suitable organic dehydrating agents which, for ease of handling, have from 2 to about 25 carbons are: alkyl and aryl isocyanates such as methyl isocyanate, benzene isocyanate, toluidene diisocyanate, amyl isocyanate, isooctyl isocyanate, etc.; N,N'-alkyl and aryl substituted carbodiimides such as N,N'-dimethyl carbodiimide, N,N'-diethyl carbodiimide, N,N'-diisopropyl carbodiimide, N,N'-dibutyl carbodiimide, N-amyl, N'-methyl carbodiimide, N,N'-dicyclohexyl carbodiimide, N,N'-diphenyl carbodiimide, N,N'-dibenzyl carbodiimide, etc.; alkyl acetals and ketals such as 1,1-diethoxyethane, 1,1-dibutoxyethane, 2,2 - dimethoxypropane, 2,2 - diethoxybutane, 3,3- diisopropoxypropane, 3,3-dipentoxyhexane, 1,1-dimethoxycyclohexane, etc.; alkyl orthoesters such as ethyl orthoformate, methyl orthoformate, butyl orthoacetate, ethyl orthoacetate, etc.

The reduced cuprous salts can readily be reoxidized to cupric by conducting the reaction in the anode chamber of the electrolytic cell and applying a voltage between the electrodes so as to remove electrons from the anode chamber, i.e., from the cuprous ions and thereby oxidize these ions to cupric. In this embodiment, the catholyte preferably comprises an aqueous hydrogen halide solution and hydrogen is liberated at this cathode with the hydrogen ions passing through a salt bridge or other permeable diaphragm between the cells.

Various mechanical designs of electrolytic cells can be used in the oxidation. In general, such cells comprise two chambers which are separated by a porous diaphragm to prevent a mixture of the electrolytes. These chambers are preferably equipped with mechanical stirrers and heating or cooling elements to maintain the desired reaction temperature. The anode chamber can be composed of or lined with stainless steel or any other similar corrosion resistant material. The anode can be carbon or any inert metal, i.e., any metal having an oxidation potential more negative than the oxidizing potential of the Group VIII noble metal and redox salts in the anolyte. Generally, carbon electrodes are preferred.

The cathode chamber can be constructed of or lined with stainless steel or other similar corrosion resistant metals; however, mild or carbon steel can also be used when the walls of the cathode chamber are employed as the cathode by applying the negative potential of the cell thereto. In this method, current densities greater than about 0.4 amperes per square centimeter can be used in this chamber and at this current density, substantially no corrosion of the mild steel will occur.

The cell chambers are separated by a membrane which prevents mixing of the anolyte and catholyte, yet which is sufficiently porous to permit passage of current conducting ions, particularly hydrogen ions as hereafter described. In general, various ceramic materials such as fritted glass or sintered glass powders can be used. Other suitable membranes can be porous or foamed plastics such as Teflon, asbestos, etc.

The mechanical design of the cell can be widely varied. The cell can comprise separate vessels in juxtaposition communicating with each other by a salt bridge or common arm which contains the porous membrane. If desired, the chambers can be provided within a single vessel by dividing the vessel with a wall, a portion or all of which comprises the aforementioned porous membrane. In a preferred design, the chambers are concentrically positioned cylinders having a steel outer vessel to be used as the cathode and an inner concentric cylinder composed of the porous membrane. Within the latter is disposed a carbon rod which, preferably, is fluted to expose a maximum surface area which is used as the anode. An inlet for the olefin and anolyte and an outlet for removal of the anolyte and product are provided interiorly of the porous membrane, i.e., in the anode chamber, and a gas outlet is provided in the annular chamber between the porous membrane and the outer vessel, i.e., in the cathode chamber. The conditions of oxidation within the anode chamber can be as follows:

| Condition | Broad | Preferred |
| --- | --- | --- |
| Current density (amperes per sq. cm.) | 0.4–4×10⁻⁵ | 10⁻²–10⁻⁵ |
| Voltage (volts) | 2–100 | 2–10 |

The electrolytic processing can conveniently be performed in the aforementioned or any conventional electrolytic cell by using an anolyte that comprises, preferably, an anhydrous reaction medium containing any of the aforementioned alcohols alone or in admixture with any of the aforementioned solvents. The anhydrous state can be assured by use of from 1 to 50, preferably 1 to 15 percent of any of the aforementioned dehydrating agents. The anolyte also contains a soluble salt of the aforementioned platinum metals, and, preferably, a soluble salt of one of the aforementioned multivalent metals, these salts being used in the previously set forth concentrations.

The catholyte can be any current conducting solution, preferably aqueous or alcoholic. The solution can be neutral or acidic in pH and, for maximum conductivity, acid values, e.g., pH of 4.0 and less can be used. Aqueous or lower ($C_1$–$C_5$) alkanolic solutions of mineral acids can be used for the catholyte, e.g., sulfuric, nitric, acetic, hydrochloric, etc., in concentrations from 0.1 to 10 molar. A chemical reduction occurs at the cathode and a variety of reactions can be performed in the cathode chamber, if desired. To illustrate, naphthalene can be hydrogenated to tetralin or decalin, benzene can be hydrogenated to cyclohexane by introducing these aromatics into the cathode chamber. Other inorganic reductions, e.g., reduction of metal oxides and salts to metals can be used to produce zinc, copper, sodium metal, etc. Preferably, the oxidation in the anode chamber is not complicated by imposing additional current density and voltage requirements for a particular reduction in the cathode chamber, but rather, the reduction of hydrogen ions to electrolytic hydrogen is performed in the cathode chamber.

The following examples will illustrate a mode of practice of my invention and demonstrate the results obtainable therefrom:

EXAMPLE 1

The oxidative carbonylation of ethylene to ethyl acrylate and ethyl beta-ethoxy propionate was performed in an electrolytic cell. The electrolytic cell comprised an anode chamber formed by a 250 milliliter, three-necked flask having a bottom and top side outlet. The bottom side outlet was connected to the side arm of another flask that served as the cathode chamber. A fritted glass disc was placed in the side connection between the flasks to separate the anolyte and catholyte used in the reaction. The top side outlet from the anode chamber was connected to a water cooled condenser and the outlet of the water cooled condenser was passed through a wet ice and two Dry Ice traps. A stirrer was provided in the anode chamber and a glass tube was placed in the anode chamber and connected to a source of ethylene. A platinum screen was employed in the anode chamber as the anode and a pool of mercury was placed in the bottom of the cathode chamber to serve as the cathode.

An externally applied direct current voltage of about 15 volts was applied between the anode and cathode. The anode chamber was charged with a solution of 100 grams absolute ethanol containing palladous chloride, cupric chloride, 29 grams lithium perchlorate and 100 milliliters triethylorthorformate. The cathode chamber was charged with 20 milliliters ethanol and 2.5 milliliters sulfuric acid. The reaction was performed at 25° C. and initiated by introducing ethylene beneath the liquid level in the anode chamber while stirring the anolyte and applying a sufficient direct current voltage to furnish about 58 milliamperes of current.

The reaction was performed for 3 hours and the product was collected in the ice traps. Upon completion of the reaction, the contents of the traps were combined and analyzed to determine that ethyl beta-ethoxy propionate was the major product of the reaction with some yields of ethyl acrylate.

When the reaction is performed with the substitution of other alcohols for the methanol, e.g., replacement of the methanol with an equal weight of butanol or octanol, substantially the same conversion to the butyl and octyl esters is achieved.

When the reaction is repeated with propylene, substantially the same conversion is observed to produce methyl beta-methoxy butyrate and methyl crotonate.

The preceding example is set forth solely to illustrate a mode of practice of the invention and to demonstrate the results obtainable thereby. The example is not intended to be unduly limiting of the invention but only to illustrate a preferred mode of practice thereof. The invention is intended to be defined by the method steps and reagents or their apparent equivalents set forth in the following claims.

I claim:
1. The electrolytic oxidative carbonylation, in an electrolytic cell having anode and cathode chambers separated by a porous member, of a hydrocarbon olefin having from 2 to about 20 carbons to an ester of an alpha,beta-ethylenically unsaturated carboxylic acid or a beta-alkoxy carboxylic acid that comprises introducing said olefin, carbon monoxide and a monohydroxy alcohol into said anode chamber to contact therein an anolyte comprising a substantially anhydrous liquid containing a soluble salt of a platinum group metal to reduce said metal to a lower oxidation state by said contacting while simultaneously oxidizing said metal to regenerate the same in said anode chamber by applying a voltage to the electrodes of said cell to pass a direct current through said cell.
2. The electrolytic oxidative carbonylation of claim 1 wherein said anolyte also contains a soluble salt of a multivalent metal having an oxidation potential more positive than said platinum metal.
3. The carbonylation of claim 2 wherein said platinum metal is palladium and said multivalent metal is copper.
4. The carbonylation of claim 1 wherein said olefin is ethylene, said alcohol is an aliphatic alcohol having 1 to about 6 carbons and said ester is an alkyl acrylate.
5. The oxidation of claim 1 wherein the catholyte comprises a substantially anhydrous hydrogen halide solution and wherein hydrogen is liberated in said cathode.

References Cited
UNITED STATES PATENTS 2,680,713  6/1954  Lindsey et al. _____ 204—59
2,760,926  8/1956  Kronenthal _____ 204—59

JOHN H. MACK, Primary Examiner

H. M. FLOURNOY, Assistant Examiner

U.S. Cl. X.R.

204—80